(12) United States Patent
Valente

(10) Patent No.: US 8,059,715 B2
(45) Date of Patent: Nov. 15, 2011

(54) VIDEO ENCODING AND DECODING METHODS AND CORRESPONDING DEVICES

(75) Inventor: Stéphane Valente, Paris (FR)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1524 days.

(21) Appl. No.: 10/567,397

(22) PCT Filed: Jul. 14, 2004

(86) PCT No.: PCT/IB2004/002478
§ 371 (c)(1),
(2), (4) Date: Feb. 7, 2006

(87) PCT Pub. No.: WO2005/015501
PCT Pub. Date: Feb. 17, 2005

(65) Prior Publication Data
US 2007/0019723 A1    Jan. 25, 2007

(30) Foreign Application Priority Data

Aug. 12, 2003  (EP) .................................... 03300084
Aug. 12, 2003  (EP) .................................... 03300085

(51) Int. Cl.
*H04N 7/12* (2006.01)

(52) U.S. Cl. ................................................ 375/240.12
(58) Field of Classification Search ........... 375/240–241
See application file for complete search history.

(56) References Cited

U.S. PATENT DOCUMENTS
5,699,121 A    12/1997 Zakhor et al.
(Continued)

FOREIGN PATENT DOCUMENTS
WO    9715146 A1    4/1997
(Continued)

OTHER PUBLICATIONS

Neff et al. Matching Pursuit Video Coding—Part I: Dictionary Approximation, IEEE, 2002, p. 13-26.*

(Continued)

*Primary Examiner* — Sam K Ahn
(74) *Attorney, Agent, or Firm* — DLA Piper LLP (US)

(57) ABSTRACT

The invention relates to the field of video compression and, more specifically, to a video encoding method applied to an input sequence of frames in which each frame is subdivided into blocks of arbitrary size. This method comprises, for at least a part of said blocks of the current frame, the steps of generating on a block basis motion-compensated frames, each one being obtained from each current original frame and a previous reconstructed frame, generating from said motion-compensated frames residual signals, using a so-called matching pursuit (MP) algorithm for decomposing each of said generated residual signals into coded dictionary functions called atoms, the other blocks of the current frame being processed by means of other coding techniques, and coding said atoms and the motion vectors determined during the motion compensation step, for generating an output coded bitstream. According to the invention, said method is such that, when using said MP algorithm, a specific dictionary is available at the encoding side for each block shape respectively. According to another implementation, it is also possible to use several specific dictionaries. In this second solution, if several dictionaries are available at the encoding side, a bitstream syntax is defined for placing, at a predetermined level, flags provided to indicate which dictionary should be used and placed for example at the atom level, at the block level, at the macroblock level or at the picture level.

16 Claims, 3 Drawing Sheets

U.S. PATENT DOCUMENTS

| | | | |
|---|---|---|---|
| 6,148,106 | A | 11/2000 | Impagliazzo |
| 7,003,039 | B2 | 2/2006 | Zakhor et al. |
| 2003/0058943 | A1 | 3/2003 | Zakhor et al. |
| 2003/0103523 | A1 | 6/2003 | Frossard et al. |
| 2004/0131268 | A1 | 7/2004 | Sekiguchi et al. |
| 2004/0264792 | A1 | 12/2004 | Hwang et al. |

FOREIGN PATENT DOCUMENTS

| | | |
|---|---|---|
| WO | 9813787 A1 | 4/1998 |
| WO | 0149037 A1 | 7/2001 |

OTHER PUBLICATIONS

Al-Shaykh, et al., "Video Compression Using Matching Pursuits", IEEE Trans. on Circuits and Systems for Video Techn., vol. 9, No. 1, pp. 123-143 (1999).

Auyeung, et al., "Overlapped Block Motion Compensation", SPIE, vol. 1818, Visual Communications and Image Processing, pp. 561-571 (1992).

Mallat, S., et al. "Matching Pursuits with Time-Frequency Dictionaries", IEEE Trans. on Signal Processing, vol. 41, No. 12, pp. 3397-3415 (1993).

Neff, R., et al., "Matching Pursuit Video Coding at Very Low Bit Rates", IEEE, pp. 411-420 (1995).

Gharavi-Alkhansari, M., et al., "Fractal Video Coding by Matching Pursuit", IEEE, pp. 157-160 (1996).

Banham, M., et al., "A Selective Update Approach to Matching Pursuits Video Coding", IEEE Trans. on Circuits and Systems for Video Techn., vol. 7, No. 1, pp. 119-129 (1997).

Neff, R., et al., "Very Low Bit-Rate Video Coding Based on Matching Pursuits," IEEE Trans. on Circuits and Systems for Video Techn., vol. 7, No. 1, pp. 158-171 (1997).

Goodwin, "Adaptive Signal Models: Theory, Algorithm, and Audio Applications", thesis, University of California, Berkeley, cover pp. v, vi, 1, 2, 185-221 (1997).

Ebrahimi, "MPEG4 Video Verification Model", chapter 14.3 ("Matching Pursuit Inter Texture Coding Mode"), pp. 252-259 (1997).

Kaup, A., et al., "Coding of Segmented Images Using Shape-Independent Basis Functions", IEEE Trans. on Image Processing, vol. 7, No. 7, pp. 937-947 (1998).

Wohlberg, B., et al., A Review of the Fractal Image Coding Literature, vol. 8, No. 12, pp. 1716-1729 (1999).

Neff, R., "New Methods for Matching Pursuit Video Compression", thesis, University of California, Berkeley, cover—xvi (2000).

Moschetti, F., et al. "New Dictionary and Fast Atom Searching Method for Matching Pursuit Representation of Displaced Frame Difference", IEEE ICIP, pp. 685-688 (2002).

Ferreira Da Silva, et al., "Approximations with Evolutionary Pursuit", Signal Processing, Amsterdam, NL, vol. 83, No. 3, pp. 465-481 (2003).

Valente, S., et al., "Rate/Distortion-Based Combination of Multiple DCT Transforms for Video Coding", Proceedings 2002 International Conference on Image Processing, ICIP 2002, New York, vol. 2 of 3, pp. 665-668 (2002).

Ishizaki, T., at al., "Matching Pursuits Coding for MC Error Image Divided into Sub-Bands", IEICE Technical Report, IE2002, pp. 259-265 (2003) (Abstract).

Valente, Stéphane, "Video Coding Ecology Using DCT and Block-Restricted Matching Pursuit", Proceedings 2003 International Conference on Image Processing, ICIP-2003, vol. II, pp. 799-802 (2003).

\* cited by examiner

VIDEO ENCODING AND DECODING METHODS AND CORRESPONDING DEVICES

FIELD OF THE INVENTION

The present invention generally relates to the field of video compression and, for instance, more particularly to the video standards of the MPEG family (MPEG-1, MPEG-2, MPEG-4) and to the video coding recommendations of the ITU H26X family (H.261, H.263 and extensions). More specifically, the invention relates to a video encoding method applied to an input sequence of frames in which each frame is subdivided into blocks of arbitrary size, said method comprising for at least a part of said blocks of the current frame the steps of:

- generating on a block basis motion-compensated frames, each one being obtained from each current original frame and a previous reconstructed frame;
- generating from said motion-compensated frames residual signals;
- using a so-called matching pursuit (MP) algorithm for decomposing each of said generated residual signals into coded dictionary functions called atoms, the other blocks of the current frame being processed by means of other coding techniques;
- coding said atoms and the motion vectors determined during the motion compensation step, for generating an output coded bitstream.

BACKGROUND OF THE INVENTION

In the current video standards (up to the video coding MPEG-4 standard and H.264 recommendation), the video, described in terms of one luminance channel and two chrominance ones, can be compressed thanks to two coding modes applied to each channel: the "intra" mode, exploiting in a given channel the spatial redundancy of the pixels (picture elements) within each image, and the "inter" mode, exploiting the temporal redundancy between separate images (or frames). The inter mode, relying on a motion compensation operation, allows to describe an image from one (or more) previously decoded image(s) by encoding the motion of the pixels from one (or more) image(s) to another one. Usually, the current image to be coded is partitioned into independent blocks (for instance, of size 8×8 or 16×16 pixels in MPEG-4, or of size 4×4, 4×8, 8×4, 8×8, 8×16, 16×8 and 16×16 in H.264), each of them being assigned a motion vector (the three channels share such a motion description). A prediction of said image can then be constructed by displacing pixel blocks from a reference image according to the set of motion vectors associated to each block. Finally, the difference, or residual signal, between the current image to be encoded and its motion-compensated prediction can be encoded in the intra mode (with 8×8 discrete cosine transforms—or DCTs—for MPEG-4, or 4×4 DCTs for H.264 in the main level profile).

The DCT is probably the most widely used transform, because it offers a good compression efficiency in a wide variety of coding situations, especially at medium and high bitrates. However, at low bitrates, the hybrid motion compensated DCT structure may be not able to deliver an artefact-free sequence for two reasons. First, the structure of the motion-compensated inter prediction grid becomes visible, with blocking artifacts. Moreover, the block edges of the DCT basis functions become visible in the image grid, because too few coefficients are quantized—and too coarsely—to make up for these blocking artifacts and to reconstruct smooth objects in the image.

The document "Very low bit-rate video coding based on matching pursuits", R. Neff and A. Zakhor, IEEE Transactions on Circuits and Systems for Video Technology, vol. 7, n° 1, Feb. 1997, pp. 158-171, describes a new motion-compensated system including a video compression algorithm based on the so-called matching pursuit (MP) algorithm, a technique developed about ten years ago (see the document "Matching pursuits with time-frequency dictionaries", S. G. Mallat and Z. Zhang, IEEE Transactions on Signal Processing, vol. 41, n° 12, Dec. 1993, pp. 3397-3414). Said technique provides a way to iteratively decompose any function or signal (for example, image, video, . . . ) into a linear expansion of waveforms belonging to a redundant dictionary of basis functions, well localized both in time and frequency and called atoms. A general family of time-frequency atoms can be created by scaling, translating and modulating a single function $g(t) \in L^2(R)$ supposed to be real and continuously differentiable. These dictionary functions may be designated by:

$$g_\gamma(t) \in G (G = \text{dictionary set}), \quad (1)$$

$\gamma$ (=gamma) being an indexing parameter associated to each particular dictionary element (or atom). As described in the first cited document, assuming that the functions $g_\gamma(t)$ have unit norm, i.e. $<g_\gamma(t), g_\gamma(t)> = 1$, the decomposition of a one-dimensional time signal $f(t)$ begins by choosing $\gamma$ to maximize the absolute value of the following inner product:

$$p = <f(t), g_\gamma(t)>, \quad (2)$$

where p is called an expansion coefficient for the signal $f(t)$ onto the dictionary function $g_\gamma(t)$. A residual signal R is then computed:

$$R(t) = f(t) - p \cdot g_\gamma(t) \quad (3)$$

and this residual signal is expanded in the same way as the original signal $f(t)$. An atom is, in fact, the name given to each pair $\gamma_k, p_k$ where k is the rank of the iteration in the matching pursuit procedure. After a total of M stages of this iterative procedure (where each stage n yields a dictionary structure specified by $\gamma_n$, an expansion coefficient $p_n$ and a residual $R_n$ which is passed on to the next stage), the original signal $f(t)$ can be approximated by a signal $\hat{f}(t)$ which is a linear combination of the dictionary elements thus obtained. The iterative procedure is stopped when a predefined condition is met, for example either a set number of expansion coefficients is generated or some energy threshold for the residual is reached.

In the first document mentioned above, describing a system based on said MP algorithm and which performs better than the DCT ones at low bitrates, original images are first motion-compensated, using a tool called overlapped block-motion compensation which avoids or reduces blocking artifacts by blending the boundaries of predicted/displaced blocks (the edges of the blocks are therefore smoothed and the block grid is less visible). After the motion prediction image is formed, it is subtracted from the original one, in order to produce the motion residual. Said residual is then coded, using the MP algorithm extended to the discrete two-dimensional (2D) domain, with a proper choice of a basis dictionary (said dictionary consists of an overcomplete collection of 2D separable Gabor functions g, shown in FIG. 1).

A residual signal f is then reconstructed by means of a linear combination of M dictionary elements:

$$\hat{f} = \sum_{n=1}^{n=M} \hat{p}_n \cdot g_{\gamma_n} \quad (4)$$

If the dictionary basis functions have unit norm, $\hat{p}_n$ is the quantized inner product $\langle,\rangle$ between the basis function $g_{\gamma_n}$ and the residual updated iteratively, that is to say:

$$p_n = \left\langle f - \sum_{k=1}^{k=n-1} \hat{p}_k \cdot g_{\gamma_k}, g_{\gamma_n} \right\rangle \quad (5)$$

the pairs $(\hat{p}_n, \gamma_n)$ being the atoms. In the work described by the authors of the document, no restriction is placed on the possible location of an atom in an image (see FIG. 2). The 2D Gabor functions forming the dictionary set are defined in terms of a prototype Gaussian window:

$$w(t) = \sqrt[4]{2} \cdot e^{-\pi t^2} \quad (6)$$

A monodimensional (1D) discrete Gabor function is defined as a scaled, modulated Gaussian window:

$$g_{\vec{\alpha}}(i) = K_{\vec{\alpha}} \cdot w\left(\frac{i - \frac{N}{2} + 1}{s}\right) \cdot \cos\left(\frac{2\pi\xi\left(i - \frac{N}{2} + 1\right)}{N} + \phi\right) \quad (7)$$

with: $i \in \{0, 1, \ldots, N-1\}$.

The constant $K_{\vec{\alpha}}$ is chosen so that $g_{\vec{\alpha}}(i)$ is of unit norm, and $\vec{\alpha} = (s, \xi, \phi)$ is a triple consisting, respectively, of a positive scale, a modulation frequency, and a phase shift. If S is the set of all such triples $\vec{\alpha}$, then the 2D separable Gabor functions of the dictionary have the following form:

$$G_{\vec{\alpha},\vec{\beta}}(i,j) = g_{\vec{\alpha}}(i) g_{\vec{\beta}}(j) \text{ for } i,j \in \{0,1,\ldots,N-1\}, \text{ and } \vec{\alpha}, \vec{\beta} \in S \quad (8)$$

The set of available dictionary triples and associate sizes (in pixels) indicated in the document as forming the 1D basis set (or dictionary) is shown in the following table 1:

TABLE 1

| k | $s_k$ | $\xi_k$ | $\phi_k$ | size (pixels) |
|---|---|---|---|---|
| 0 | 1.0 | 0.0 | 0 | 1 |
| 1 | 3.0 | 0.0 | 0 | 5 |
| 2 | 5.0 | 0.0 | 0 | 9 |
| 3 | 7.0 | 0.0 | 0 | 11 |
| 4 | 9.0 | 0.0 | 0 | 15 |
| 5 | 12.0 | 0.0 | 0 | 21 |
| 6 | 14.0 | 0.0 | 0 | 23 |
| 7 | 17.0 | 0.0 | 0 | 29 |
| 8 | 20.0 | 0.0 | 0 | 35 |
| 9 | 1.4 | 1.0 | $\pi/2$ | 3 |
| 10 | 5.0 | 1.0 | $\pi/2$ | 9 |
| 11 | 12.0 | 1.0 | $\pi/2$ | 21 |
| 12 | 16.0 | 1.0 | $\pi/2$ | 27 |
| 13 | 20.0 | 1.0 | $\pi/2$ | 35 |
| 14 | 4.0 | 2.0 | 0 | 7 |
| 15 | 4.0 | 3.0 | 0 | 7 |
| 16 | 8.0 | 3.0 | 0 | 13 |
| 17 | 4.0 | 4.0 | 0 | 7 |
| 18 | 4.0 | 2.0 | $\pi/4$ | 7 |
| 19 | 4.0 | 4.0 | $\pi/4$ | 7 |

To obtain this parameter set, a training set of motion residual images was decomposed using a dictionary derived from a much larger set of parameter triples. The dictionary elements which were most often matched to the training images were retained in the reduced set. The obtained dictionary was specifically designed so that atoms can freely match the structure of motion residual image when their influence is not confined to the boundaries of the block they lie in (see FIG. 2 shoving the example of an atom placed in a block-divided image without block-restrictions).

However, it has been recently proposed, in a European patent application filed on Aug. 5, 2003, by the applicant with the number EP03300081.1 (PHFR030085), a hybrid motion-compensated coding system using atoms that are confined to block boundaries, as depicted in FIG. 3. More precisely, the invention described and claimed in said patent application mainly relates to a video encoding method applied to an input sequence of frames in which each frame is subdivided into blocks of arbitrary size, said method comprising for at least a part of said blocks of the current frame the steps of:

generating on a block basis motion-compensated frames, each one being obtained from each current original frame and a previous reconstructed frame;

generating from said motion-compensated frames residual signals;

using a so-called matching pursuit (MP) algorithm for decomposing each of said generated residual signals into coded dictionary functions called atoms, the other blocks of the current frame being processed by means of other coding techniques (the words "at least a part of said blocks" used above mean that some blocks or all the blocks are concerned by the implementation of the invention, the other ones being processed by these other techniques, which justifies the fact that the coding system is called "hybrid");

coding said atoms and the motion vectors determined during the motion compensation step, for generating an output coded bitstream;

said method being such that, when using said MP algorithm, any atom acts only on one block B at a time, said block-restriction leading to the fact that the reconstruction of a residual signal f is obtained from a dictionary that is composed of basis functions $g_{\gamma_n}|_B$ restricted to the block B corresponding to the indexing parameter $\gamma_n$, according to the following 2D spatial domain operation:

$g_{\gamma_n}|_B(i,j) = g_{\gamma_n}(i,j)$ if pixel $(i,j) \in B$ $g_{\gamma_n}|_B(i,j) = 0$ otherwise (i.e. $(i,j) \notin B$).

The main interest of this previous approach is to better model the blocky structure of residual signals, to augment the dictionary diversity for the same coding cost and to offer the possibility of alternating MP and DCT transforms since there is no interference across block boundaries (it also avoids the need to resort to overlapped motion compensation to limit blocking artefacts). The main elements useful to understand this previous implementation are recalled with reference to FIGS. 4 to 7.

A simplified block diagram of a video encoding device implementing a hybrid video coder using multiple coding engines is shown in FIG. 4. Several coding engines implement predetermined coding techniques, for instance a coding engine 41 can implement the intra-DCT coding method, a second one 42 the inter-DCT coding method, and a third one 43 the matching pursuit algorithm. Each frame of the input video sequence is received ("video signal") by a block partitioner device 44, which partitions the image into individual blocks of varying size, and decides which coding engine will process the current original block. The decisions representing the block position, its size and the selected coding engine is then inserted into the bitstream by a coding device 45. The current original signal block is then transferred to the selected coding engine (the engine 43 in the situation illustrated in FIG. 4).

A matching pursuit coding engine is illustrated in FIG. 5. Each of the original signal blocks of the input video sequence assigned to the coding engine 43 is received on one side by motion compensating means 51 for determining motion vectors (said motion vectors are conventionally found using the block matching algorithm), and the vectors thus obtained are coded by motion vector coding means 52, the coded vectors being delivered to a multiplexer 53 (referenced, but not shown). On the other side, a subtracter 54 delivers on its output the residual signal between the current image and its prediction. Said residual signal is then decomposed into atoms (the dictionary of atoms is referenced 57) and the atom parameters thus determined (module 55) are coded (module 56). The coded motion vectors and atom parameters then form a bitstream that is sent to match a predefined condition for each frame of the sequence.

The encoding engine 43 carries out a method of coding an input bitstream that comprises the following steps. First, as in most coding structures, the original frames of the input sequence are motion-compensated (each one is motion-compensated on the basis of the previous reconstructed frame, and the motion vectors determined during said motion-compensated step are stored in view of their later transmission). Residual signals are then generated by difference between the current frame and the associated motion-compensated prediction. Each of said residual signals is then compared with a dictionary of functions consisting of a collection of 2D separable Gabor functions, in order to generate a dictionary structure $g_{\gamma_n}(t)$ specified by the indexing parameter $\gamma_n$, an expansion coefficient p(n) and a residual $R_n(t)-p \cdot g_\gamma(t)$ which is passed on to the next stage of this iterative procedure. Once the atom parameters are found, they can be coded (together with the motion vectors previously determined), the coded signals thus obtained forming the bitstream sent to the decoder.

The technical solution proposed in the cited European patent application consists in confining the influence of atoms to the boundaries of the block they lie in. This block-restriction means that an atom acts only on one block at a time, confined into the motion-compensation grid, as illustrated in FIG. 3. This block-restriction modifies the signal matching pursuit algorithm in the following manner.

If one assume that it is wanted to obtain the MP decomposition of the 2D residual in a block B of size M×N pixels after motion-compensation, and if one denotes $G|_B$ the MP dictionary restricted to B, the elements $g_{\gamma_n}|_B$ of said dictionary are obtained by means of the relationships (9) and (10):

$$g_{\gamma_n}|_B(i,j) = g_{\gamma_n}(i,j) \text{ if pixel } (i,j) \in B \quad (9)$$

$$g_{\gamma_n}|_B(i,j) = 0 \text{ otherwise (i.e. } (i,j) \notin B) \quad (10)$$

In this case, since $g_{\gamma_n}|_B$ does not necessarily have a unit norm, $p_n$ needs to be reweighted as:

$$p_n = \frac{\left\langle f - \sum_{k=1}^{k=n-1} \hat{p}_k \cdot g_{\gamma_k}|_B, g_{\gamma_n}|_B \right\rangle}{\sqrt{\langle g_{\gamma_n}|_B, g_{\gamma_n}|_B \rangle}}$$

The preferred embodiment of encoding device described above sends a bitstream which is received by a corresponding decoding device. A simplified block diagram of a video decoding device according to the invention and implementing a hybrid video decoder using multiple decoding engines is shown in FIG. 6. The transmitted bitstream is received on one side by a block partition decoding device 64, which decodes the current block position, its size, and the decoding method. Given the decoding method, the bitstream elements are then transferred to the corresponding decoding engine, 61 or 62 or 63 in the case of FIG. 6, which will in turn decode the assigned blocks and output the video signal reconstructed block. The available decoding engines can be for instance an intra-DCT block decoder 61, an inter-DCT block decoder 62, and a matching pursuit block decoder 63.

An example of matching pursuit decoding engine is further illustrated in FIG. 7. The bitstream elements are received by an entropy decoder device 71, which forwards the decoded atom parameters to an atom device 72 (the dictionary of atoms is referenced 73) which reconstructs the matching pursuit functions at the decoded position within the assigned video block to form the decoded residual signal. The entropy decoder device also outputs motion vectors which are fed into a motion compensation device 74 to form a motion prediction signal from previously reconstructed video signals. The motion prediction and the reconstructed residual signal are then summed in an adder 75 to produce a video signal reconstructed block.

The interest of the previous approach, recalled above in a detailed manner, resides in the fact that because a single atom cannot span several blocks, it does not have to deal with the high-frequency discontinuities at block edges. Instead, it can be adapted to block boundaries, and even to block sizes, by designing block-size dependent dictionaries. Moreover, since overlapped motion compensation is no longer mandatory to preserve the MP efficiency, classical motion compensation may be used. However, with such an approach, it is not sure that the dictionary is well adapted to the structure of the signal to be modelled, when its atoms are confined in arbitrarily sized blocks.

SUMMARY OF THE INVENTION

It is therefore an object of the invention to propose a video encoding method based on matching pursuit algorithm and solving the above-indicated problem of adaptation.

To this end, the invention relates to a video encoding method such as defined in the introductory part of the description and which is moreover such that, when using said MP algorithm, a specific dictionary is available at the encoding side for each block shape respectively.

In another implementation of the method according to the invention, when using said MP algorithm, several dictionaries are available at the encoding side, and a bitstream syntax is defined for placing at a predetermined level flags provided to indicate which dictionary should be used.

It is another object of the invention to propose video encoding devices allowing to carry out these two implementations of the method according to the invention.

It is still an object of the invention to propose video decoding methods and devices allowing to decode signals coded by means of said video encoding methods and devices.

BRIEF DESCRIPTION OF THE DRAWINGS

The present invention will now be described, by way of example, with reference to the accompanying drawing in which.

DETAILED DESCRIPTION OF THE INVENTION

Figure 1:
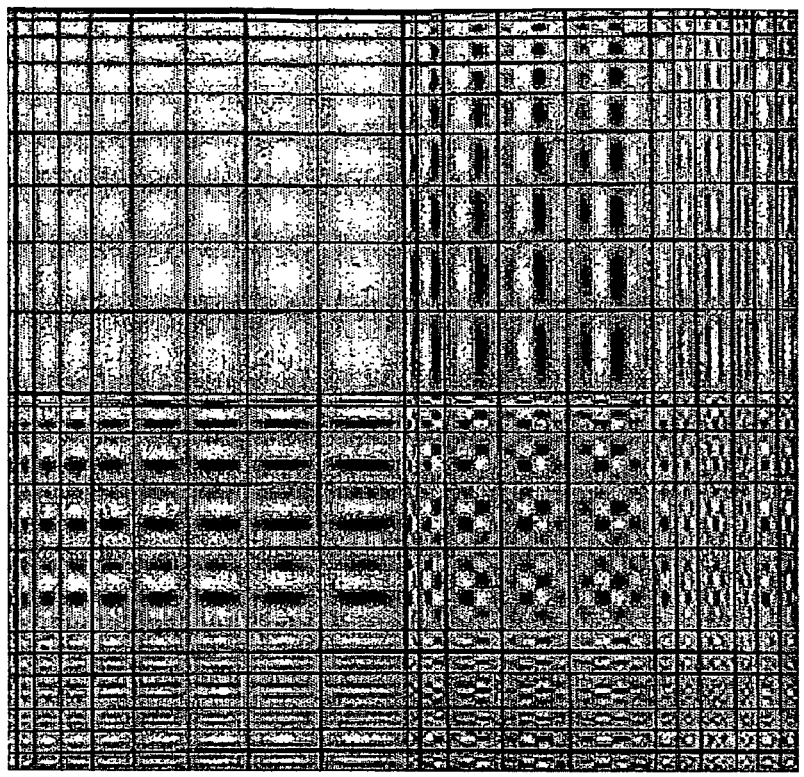
FIG. 1 allows a visualization of the 400 basis functions of the 2D Gabor dictionary used in the implementation of the matching pursuit algorithm.
Figure 2:
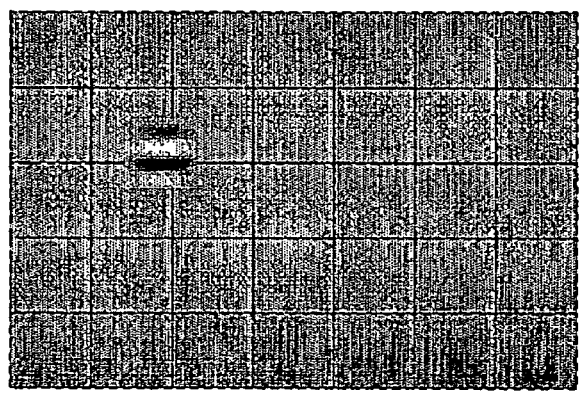
FIG. 2 illustrates the example of an atom placed in a block-divided image without block-restrictions.
Figure 3:
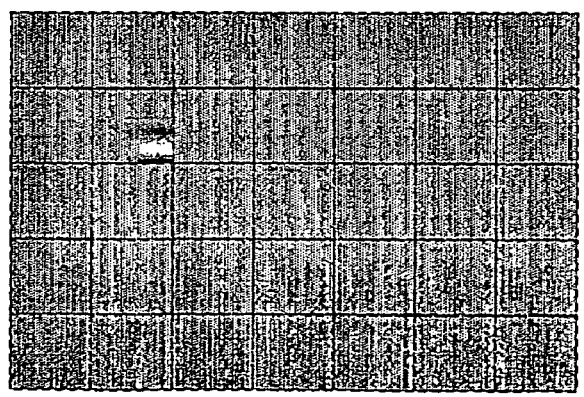
FIG. 3 illustrates the case of a block-restricted matching pursuit residual coding, with an atom being confined into the motion-compensated grid and acting only on a block at a time.
Figure 4:
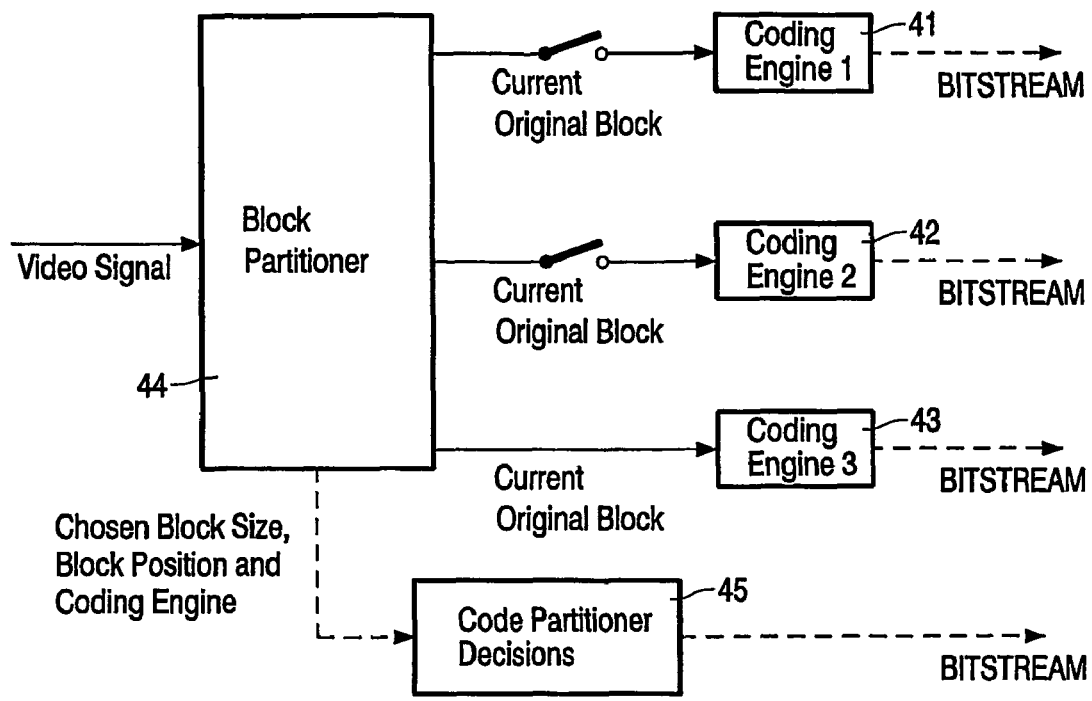
FIG. 4 illustrates an example of hybrid video encoder.
Figure 5:
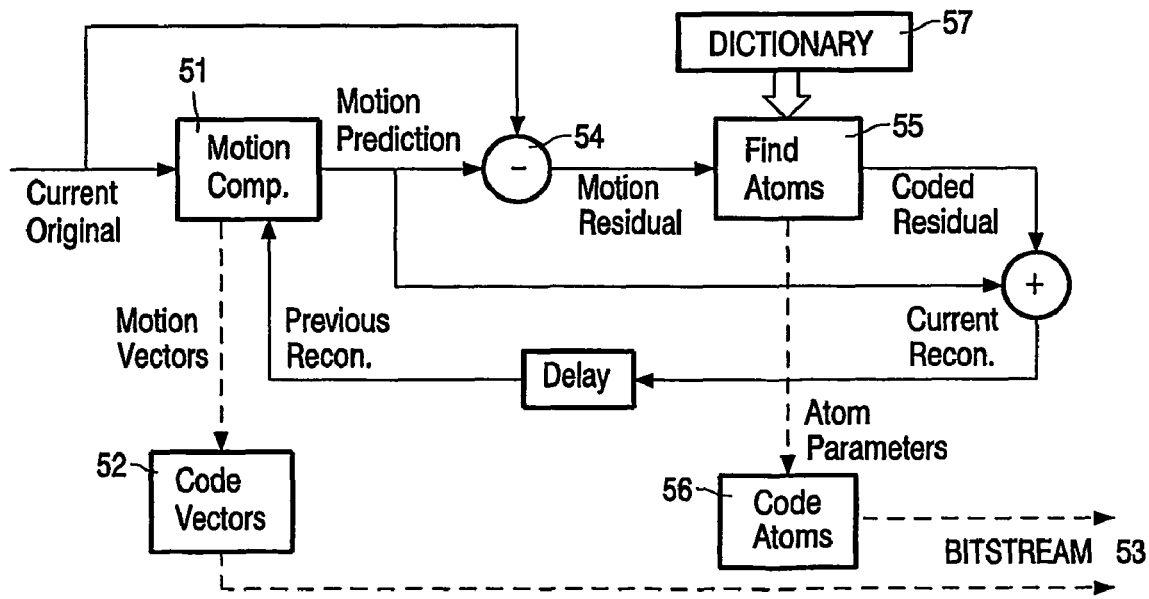
FIG. 5 shows an example of a video encoding device for implementing a MP algorithm.
Figure 6:
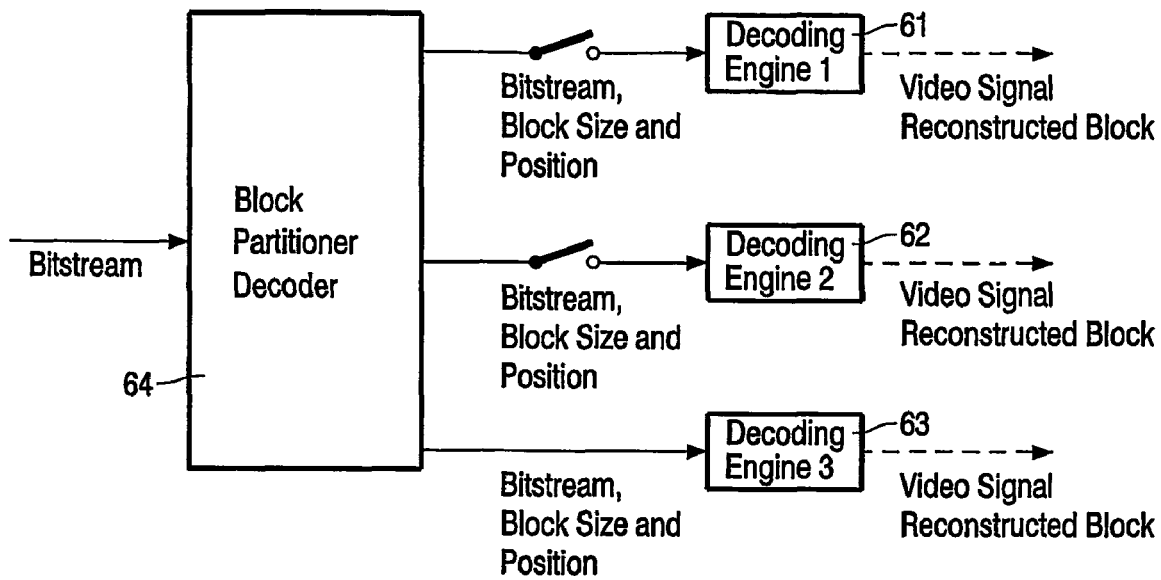
FIG. 6 illustrates an example of hybrid video decoder according to the invention.
Figure 7:
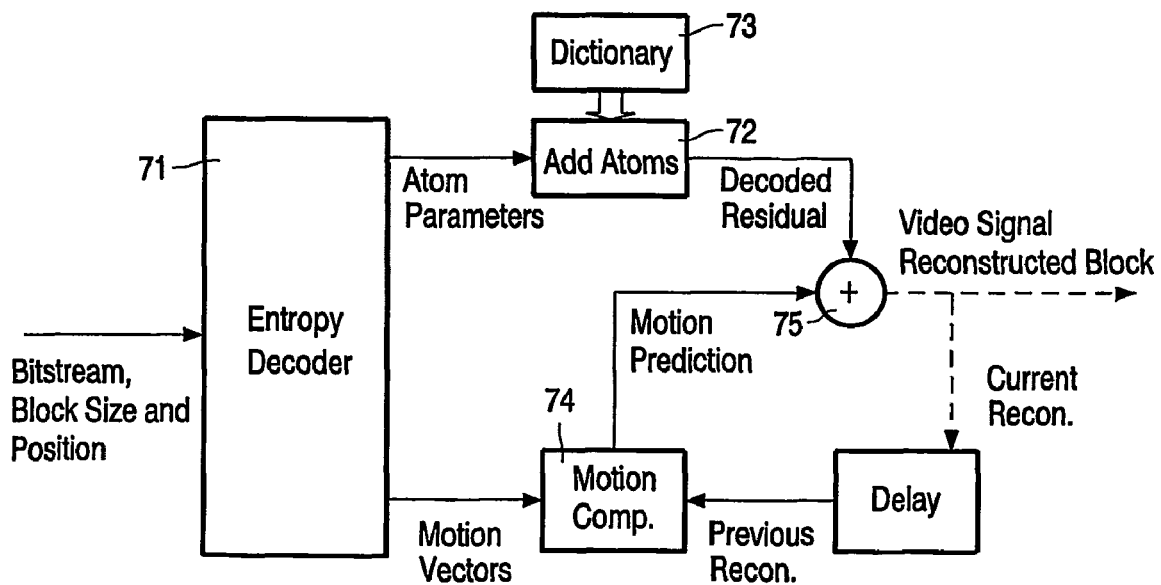
FIG. 7 shows an example of a video decoding device implementing the MP algorithm.

A simplified block diagram of a video encoding device implementing a matching pursuit algorithm has been described above in relation with FIG. 5. This encoding device carries out a method of coding an input bitstream that comprises the same steps as described above:

- the original frames of the input sequence are motion-compensated;
- residual signals are generated by difference between the current frame and the associated motion-compensated prediction;
- each of said residual signals is compared with a dictionary of functions consisting of a collection of 2D separable Gabor functions;
- once the atom parameters are found, they can be coded (together with the motion vectors previously determined), the coded signals thus obtained forming the bitstream sent to the decoder.

The technical solution now proposed according to the invention consists in having separate dictionaries, one for each block shape respectively (4×4, 4×8, 8×4, 8×8, 8×16, 16×8, 16×16, for example): with such a rule used by the encoder, the video decoder would implicitly know which dictionary an atom refers to. According to another implementation of the invention, the technical solution can also consists in providing several dictionaries, available at both the encoding side and decoding side, and in defining a bitstream syntax, which lets the encoder say to the decoder which dictionary should be used: for instance, the codeword MP_dictionary_1 tells the decoder that the next atom will refer to the first dictionary, MP_dictionary_2 tells the decoder to switch to the second dictionary, and so on, such codewords, or flags, being placed for example at the atom level, the block level, the macroblock level or the picture level.

The invention claimed is:

1. A video encoding method in an encoder applied to an input sequence of frames in which each frame is subdivided into blocks of arbitrary size, said method comprising for at least a part of said blocks of a current frame at an encoding side the steps of:
   generating block-confined motion-compensated frames, each one being obtained from each current original frame and a previous reconstructed frame;
   generating from said motion-compensated frames residual signals;
   using a matching pursuit (MP) algorithm based coding technique for decomposing each of said generated residual signals into coded dictionary functions called atoms, other blocks of the current frame being processed by means of other coding techniques;
   coding said atoms and motion vectors determined during the motion compensation step, for generating an output coded bitstream;
   said method being further characterized in that, when using said MP algorithm, a specific dictionary, of separate dictionaries available at the encoding side in said encoder, is available for each block shape respectively.

2. A video encoding method according to claim 1, characterized in that, when using said MP algorithm, several dictionaries are available at the encoding side, a bitstream syntax being defined for placing at a predetermined level flags provided to indicate which dictionary should be used.

3. A method according to claim 2, characterized in that said flags are placed at the atom level.

4. A method according to claim 2, characterized in that said flags are placed at the block level.

5. A method according to claim 2, characterized in that said flags are placed at the macroblock level.

6. A method according to claim 2, characterized in that said flags are placed at the picture level.

7. A video encoding device applied to an input sequence of frames in which each frame is subdivided into blocks of arbitrary size, said device applying to at least a part of said blocks of a current frame at an encoding side the following means:
   means for generating block-confined motion-compensated frames, each one being obtained from each current original frame and a previous reconstructed frame;
   means for generating from said motion-compensated frames residual signals;
   means for performing a matching pursuit (MP) algorithm based coding technique for decomposing each of said generated residual signals into coded dictionary functions called atoms, other blocks of the current frame being processed by means of other coding techniques;
   means for coding said atoms and motion vectors determined during the motion compensation step, for generating an output coded bitstream;
   said device being further characterized in that, when using said MP algorithm, several dictionaries are available at the encoding side in said video encoding device, one for each block shape.

8. A video decoding method in a decoder for decoding a coded bitstream generated by implementation of a video encoding method applied to an input sequence of frames in which each block is subdivided into blocks of arbitrary size, said encoding method comprising for at least a part of said blocks of a current frame at an encoding side in an encoder the steps of:
   generating block-confined motion-compensated frames, each one being obtained from each current original frame and a previous reconstructed frame;
   generating from said motion-compensated frames residual signals; using a matching pursuit (MP) algorithm based coding technique for decomposing each of said generated residual signals into coded dictionary functions called atoms, other blocks of the current frame being processed by means of other coding techniques;
   coding said atoms and motion vectors determined during the motion compensation step, for generating an output coded bitstream; a specific dictionary, of separate dictionaries available at the encoding side in said encoder, being available for each block shape respectively, said decoding method comprising at a decoding side the steps of:
   decoding said atoms and motion vectors;
   using the MP algorithm for reconstructing residual signals;
   generating from said reconstructed signals and predicted signals built from the coded motion vectors output reconstituted signal corresponding to the original frames of said input sequence;

said decoding method being further characterized in that the same dictionaries as at the encoding side are available at the decoding side in said decoder, one for each block shape respectively.

9. A video decoding device for decoding a coded bitstream generated by implementation of a video encoding method applied to an input sequence of frames in which each block is subdivided into blocks of arbitrary size, said encoding method comprising for at least a part of said blocks of a current frame at an encoding side in an encoder the steps of:

generating block-confined motion-compensated frames, each one being obtained from each current original frame and a previous reconstructed frame;

generating from said motion-compensated frames residual signals;

using a matching pursuit (MP) algorithm based coding technique for decomposing each of said generated residual signals into coded dictionary functions called atoms, other blocks of the current frame being processed by means of other coding techniques;

coding said atoms and motion vectors determined during the motion compensation step, for generating an output coded bitstream; a specific dictionary, of separate dictionaries available at the encoding side in said encoder, is available for each block shape respectively, said decoding device applying to the concerned blocks at a decoding side the following means:

means for decoding said atoms and motion vectors;

means for performing the MP algorithm, for reconstructing residual signals;

means for generating from said reconstructed signals and predicted signals built from the coded motion vectors output reconstituted signal corresponding to the original frames of said input sequence;

said decoding device being further characterized in that the same dictionaries as at the encoding side are available at the decoding side in said video decoding device, one for each block shape respectively.

10. A video encoding device applied to an input sequence of frames in which each frame is subdivided into blocks of arbitrary size, said device applying to at least a part of said blocks of a current frame at an encoding side the following means:

means for generating block-confined motion-compensated frames, each one being obtained from each current original frame and a previous reconstructed frame;

means for generating from said motion-compensated frames residual signals;

means for performing a matching pursuit (MP) algorithm based coding technique for decomposing each of said generated residual signals into coded dictionary functions called atoms, other blocks of the current frame being processed by means of other coding techniques;

means for coding said atoms and motion vectors determined during the motion compensation step, for generating an output coded bitstream;

said device being further characterized in that, when using said MP algorithm, several dictionaries are available at the encoding side in said video encoding device, and a bitstream syntax is defined for placing at a predetermined level flags provided to indicate which dictionary should be used.

11. The video encoding device of claim 10, characterized in that said flags are placed at the atom level.

12. The video encoding device of claim 10, characterized in that said flags are placed at the block level.

13. The video encoding device of claim 10, characterized in that said flags are placed at the macroblock level.

14. The video encoding device of claim 10, characterized in that said flags are placed at the picture level.

15. A video decoding method in a decoder for decoding a coded bitstream generated by implementation of a video encoding method applied to an input sequence of frames in which each block is subdivided into blocks of arbitrary size, said encoding method comprising for at least a part of said blocks of a current frame at an encoding side the steps of:

generating block-confined motion-compensated frames, each one being obtained from each current original frame and a previous reconstructed frame;

generating from said motion-compensated frames residual signals;

using a matching pursuit (MP) algorithm based coding technique for decomposing each of said generated residual signals into coded dictionary functions called atoms, other blocks of the current frame being processed by means of other coding techniques;

coding said atoms and motion vectors determined during the motion compensation step, for generating an output coded bitstream; several dictionaries being available at the encoding side, together with a bitstream syntax defined for placing at a predetermined level flags provided to indicate which dictionary should be used, said decoding method comprising at a decoding side the steps of:

decoding said atoms and motion vectors, using the MP algorithm for reconstructing residual signals;

generating from said reconstructed signals and predicted signals built from the coded motion vectors output reconstituted signal corresponding to the original frames of said input sequence;

said decoding method being further characterized in that the same dictionaries as at the encoding side are available at the decoding side in said decoder, and a step is provided for reading the transmitted flags and, when using the MP algorithm, selecting the corresponding dictionary.

16. A video decoding device for decoding a coded bitstream generated by implementation of a video encoding method applied to an input sequence of frames in which each block is subdivided into blocks of arbitrary size, said encoding method comprising for at least a part of said blocks of a current frame at an encoding side the steps of:

generating block-confined motion-compensated frames, each one being obtained from each current original frame and a previous reconstructed frame;

generating from said motion-compensated frames residual signals;

using a matching pursuit (MP) algorithm based coding technique for decomposing each of said generated residual signals into coded dictionary functions called atoms, other blocks of the current frame being processed by means of other coding techniques;

coding said atoms and motion vectors determined during the motion compensation step, for generating an output coded bitstream;

several dictionaries being available at the encoding side, together with a bitstream syntax defined for placing at a predetermined level flags provided to indicate which dictionary should be used, said decoding device applying to the concerned blocks at a decoding side the following means:

means for decoding said atoms and motion vectors, means for performing the MP algorithm, for reconstructing residual signals;

means for generating from said reconstructed signals and predicted signals built from the coded motion vectors output reconstituted signal corresponding to the original frames of said input sequence;

said decoding device being further characterized in that the same dictionaries as at the encoding side are available at the decoding side in said video decoding device, and means are provided for reading the transmitted flags and, when performing the MP algorithm, selecting the corresponding dictionary.

* * * * *